United States Patent [19]

Maeda

[11] Patent Number: 5,444,483
[45] Date of Patent: Aug. 22, 1995

[54] DIGITAL ELECTRONIC CAMERA APPARATUS FOR RECORDING STILL VIDEO IMAGES AND MOTION VIDEO IMAGES

[75] Inventor: Eiichi Maeda, Kawasaki, Japan
[73] Assignee: Ricoh Company, Ltd., Tokyo, Japan
[21] Appl. No.: 202,235
[22] Filed: Feb. 25, 1994
[30] Foreign Application Priority Data
  Feb. 25, 1993 [JP] Japan .................. 5-036782
[51] Int. Cl.6 .............................. H04N 5/76
[52] U.S. Cl. .................... 348/231; 348/239; 348/220; 358/909.1
[58] Field of Search ............... 348/239, 222, 220, 231; 358/909.1, 906, 180; H04N 5/262, 5/76, 5/228

[56] References Cited

U.S. PATENT DOCUMENTS 5,233,411 8/1993 Nam ..................... 348/231

Primary Examiner—Victor R. Kostak
Assistant Examiner—Sherrie Hsia
Attorney, Agent, or Firm—Oblon, Spivak, McClelland, Maier & Neustadt

[57] ABSTRACT

A digital electronic camera apparatus which features an image pickup for picking up an image optically and converting the picked up optical image to an analog signal. An analog/digital converter converts the analog signal to a digital signal, and a digital processor converts the digital signal to a luminance signal and color difference signals. A first memory stores a frame of the luminance signal and the color difference signals, or a frame of the digital signal output from the analog/digital converter. A second memory stores n, where n is an integer, lines of the luminance signal and the color difference signals. A third memory stores a block n×n signal from the luminance signal and the color difference signals which are in the line memory, or which are output from the digital processor means. A compressing circuit compresses the signal from the third memory. A recording device records the signal from the compressing circuit in a recording media. In accordance with the present invention, a digital electronic camera apparatus which compresses a video signal and records a greater amount of the video signal in a recording media in case of motion video and still video can be achieved.

13 Claims, 5 Drawing Sheets

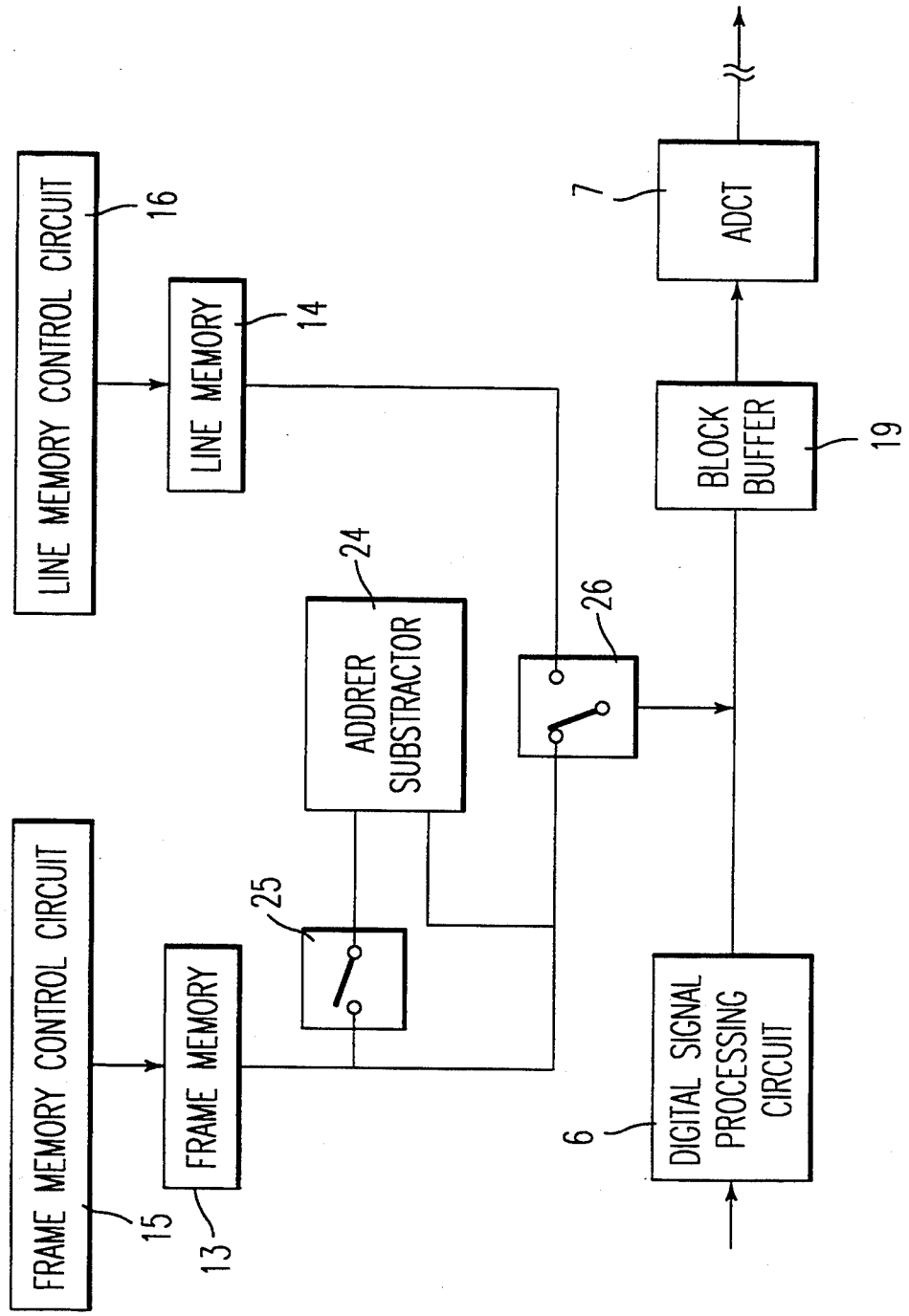

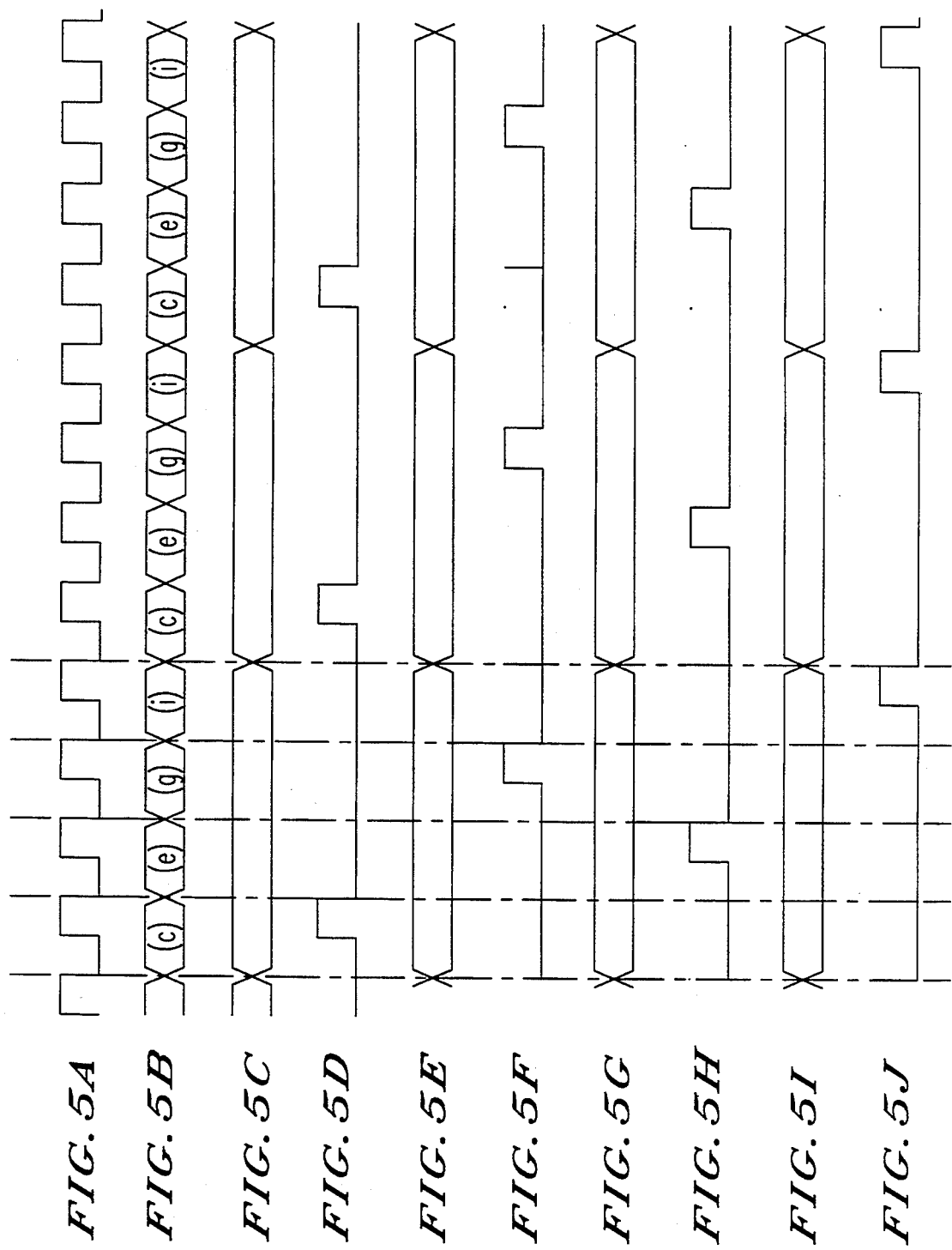

DIGITAL ELECTRONIC CAMERA APPARATUS FOR RECORDING STILL VIDEO IMAGES AND MOTION VIDEO IMAGES

BACKGROUND OF THE INVENTION

1. Field of the Invention

This invention relates to a digital electronic camera apparatus which picks up an image and records it in a recording media. The present invention particularly relates to a digital electronic camera apparatus which compresses a digital video signal and then records it in the recording media.

2. Discussion of the Background

Conventionally, there is an apparatus disclosed in Japanese Laid Open 3-429733 of a digital electronic camera apparatus. Generally, when data is compressed, memory capacity is saved, but, the signal processing requires more time. According to the device disclosed in Japanese Laid Open 3-429733, signal compression is not done in the case where a motion video is recorded or a signal compression ratio is changed between recording a motion video and a still video. As a result, signal processing time is reduced and a higher speed in picking up an image can be achieved.

In a digital electronic camera apparatus, signal processing is different between recording a motion video and a still video. That is, the signal processing time of video signal need not be considered in the case of still video, but it is concerned with the time of picking up an image in the case of motion video. In the Japanese Laid Open. 3-42973, the speed of picking up an image is improved in the case of motion video, considering the above point.

However, if the data compression is not done or the signal compression ratio is lower in the case of motion video in order to improve the speed of picking up an image, the memory capacity per picture cannot be reduced and fewer images can be recorded in a recording media.

SUMMARY OF THE INVENTION

Accordingly, one object of the present invention is to provide a novel digital electronic camera apparatus which compresses a video signal and records a greater amount of the video signal data in a recording media in the case of motion video and still video.

Another object of the present invention is to provide a novel digital electronic camera apparatus which achieves a reduction in size of the signal process circuitry.

These and other objects and advantages of the present invention are achieved in the present invention which provides for a digital electronic camera apparatus comprising image pickup means for picking up an image optically and converting the picked up optical image to an analog electronic signal, analog/digital converting means for converting the analog signal to an output digital signal, digital processing means for converting the output digital signal to a luminance signal and color difference signals, first memory means for storing a frame of the luminance signal and the color difference signals, or a frame of the digital signal output from the analog/digital converting means, second memory means for storing n lines of the luminance signal and the color difference signals, third memory means for storing a block of n×n signals from the luminance signal and the color difference signals which are in the line memory, or which are output from the digital processing means, compressing means for compressing the signal from the third memory means, and recording means for recording the signal from the compressing means in a recording media.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is a block diagram showing the main structure of a second embodiment of the present invention; and FIGS. 5(a)–5(j) are a timing chart of the structure in FIG. 4.

DESCRIPTION OF THE PREFERRED EMBODIMENT

Figure 1:
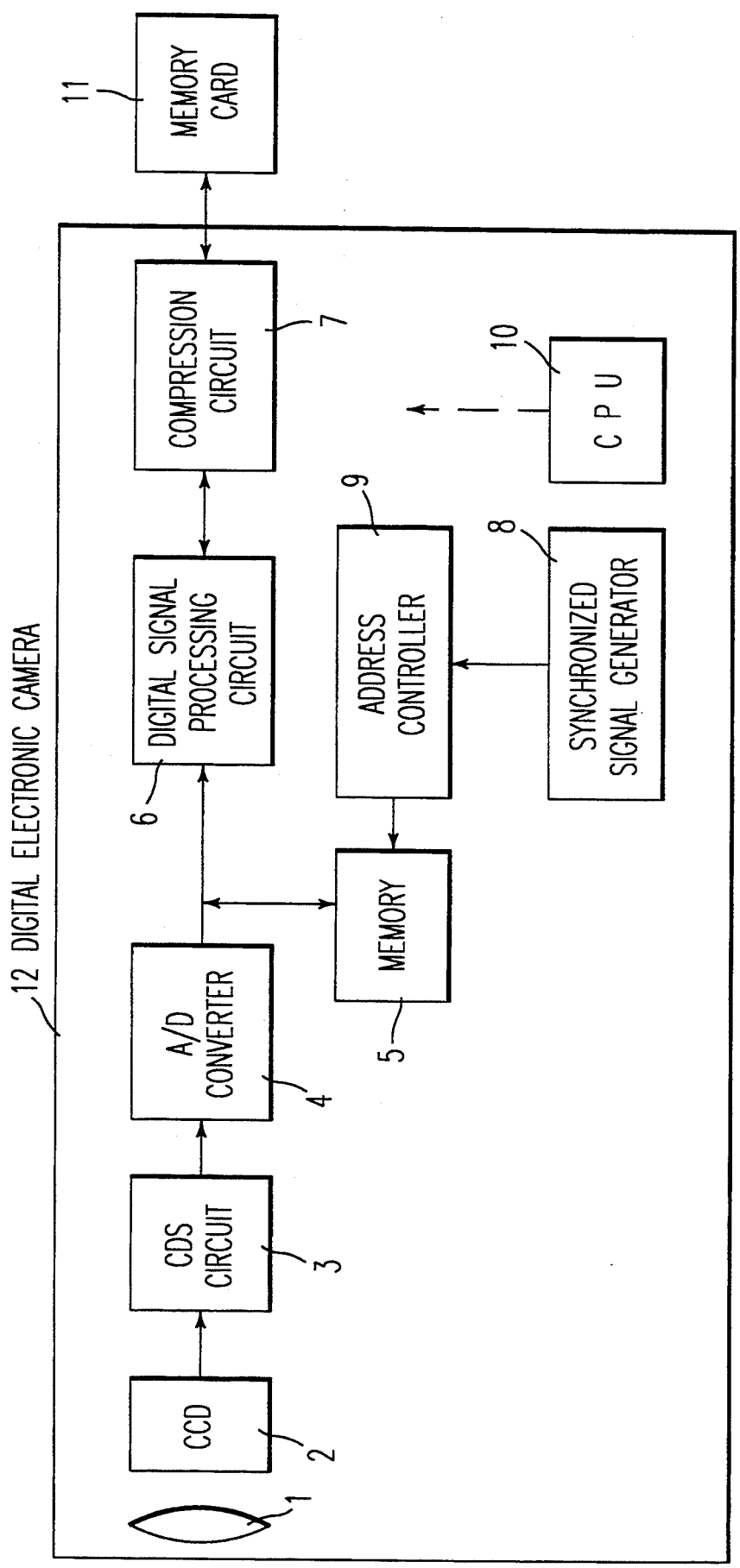
FIG. 1 is a block diagram showing a basic structure of a digital electronic camera apparatus according to the present invention.

Referring now to the drawings, wherein like reference numerals designate identical or corresponding parts throughout the several views, and more particularly to FIG. 1 thereof, there is a block diagram showing a basic structure of a digital electronic camera apparatus of the present invention. An input light, which is an input image signal, is input from a lens 1 and is converted to an electronic signal and the charge of the signal is stored in CCD 2. The charge is outputted by raster scan as a CCD signal which is an electronic signal of the input image signal. The reset noise of the CCD signal and etc. is reduced in CDS circuit 3. The CCD signal is converted to a digital signal in A/D converter 4. Then n, where n is an integer, lines of this digital signal are read from and written to a memory 5 by an address controller 9 which is controlled with the timing of a synchronized signal generator 8. Then the digital signal is converted to an n ×n block signal.

The block digital signal is converted to a block luminance signal Y and block color difference signals R-Y, B-Y in a digital signal processing circuit 6. These signals are then compressed in compression circuit 7 and are then recorded in a record media, which in FIG. 1 is shown as a memory card 11 as an example. This sequence and option is controlled by CPU 10.

Figure 2:
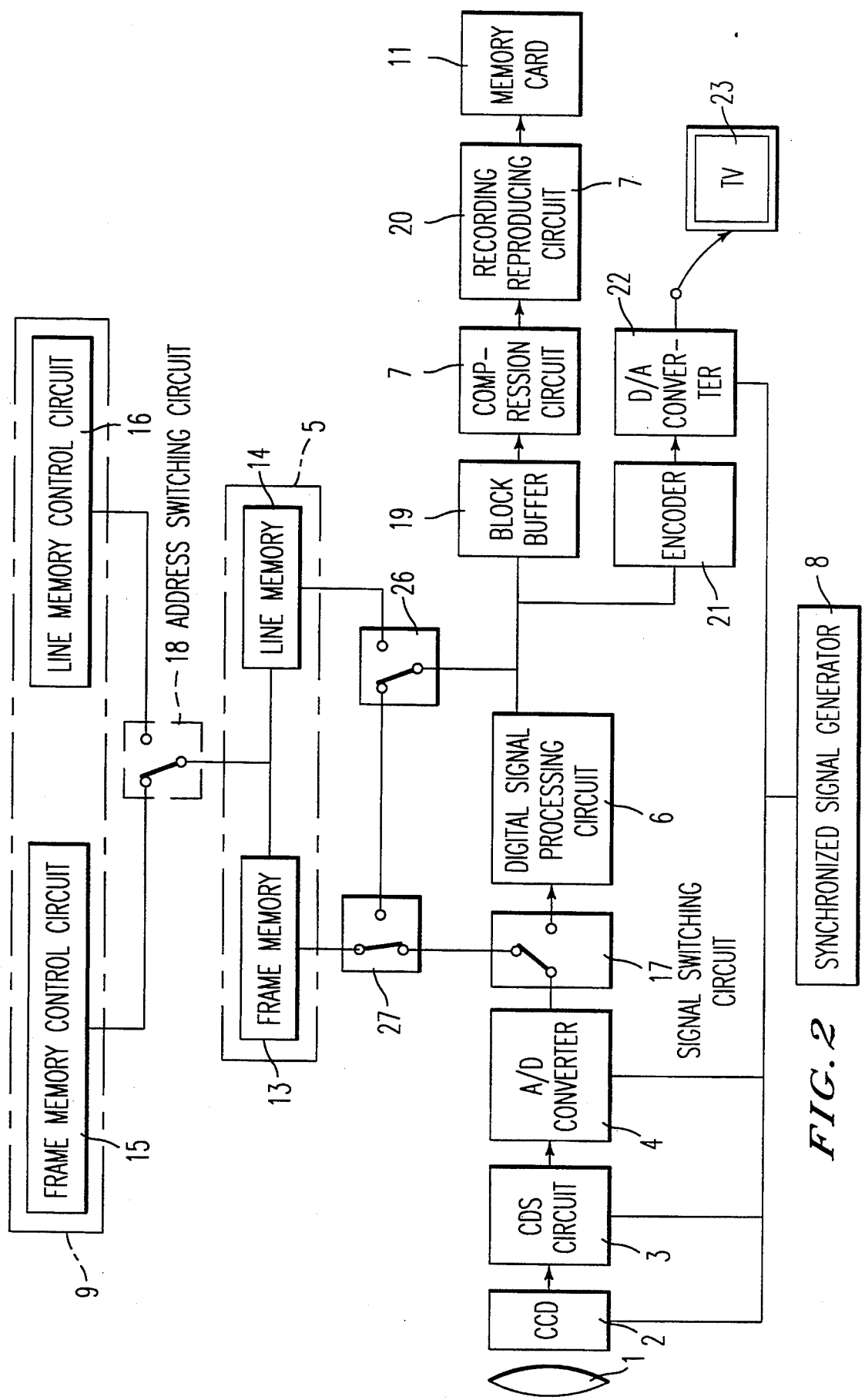
FIG. 2 is a block diagram of a first embodiment of the present invention.

FIG. 2 is a block diagram of the first embodiment of the present invention. The device of FIG. 2 includes a frame memory 13 which stores a frame of the digital signal output by A/D converter 4 or a frame of a luminance signal and two color difference signals R-Y and B-Y (these three signals are referred to as the video signal hereinafter). Two 4 Mbit (512(column)×1024-(row)×8(bits)) DRAMs may be used as the frame memories, one for the luminance signal and the other for the two color difference signals. A line memory 14 stores n lines of a video signal. The frame memory 13 and the line memory 14 correspond to the memory 5 in FIG. 1. A frame memory control circuit 15 generates an address of the frame memory 13, and a line memory control circuit 16 generates an address of the line memory 14.

The frame memory control circuit 15 and the line memory control circuit 16 correspond to the address controller 9 of FIG. 1. A signal switching circuit 17 switches an output terminal of the A/D converter 4, an input/output terminal of memory 5 and an input terminal of the digital signal processing circuit 6. An address switching circuit 18 switches the two control circuits 15 and 16.

Next, the operation of this device of the present invention will be described.

First, the case of recording still video will be described. The input light from the lens 1 is converted to a digital signal by way of the above described process. This digital signal is inputted to the memory 5 side in the switching circuit 17. At this time, the switching circuit 18 switches to the frame memory control circuit side and the digital signal is stored in the frame memory 13. After a frame of the digital signal is stored, the digital signal is read from the frame memory 13 and is converted to a video signal in the digital processing circuit 6. Then, the video signal is written to the frame memory 13 (this operation is referred as read-modify-write hereinafter). The video data is then compressed and recorded to the memory card 11.

In the case of reproduction, the compressed signal is reproduced in a record/reproduce circuit 20 and is then converted inversely to the block video signal in the compression circuit 7. This block video signal is stored in a block buffer 19 and is then written to the frame memory 13 by the control of the frame memory control circuit 15. After a frame of the video signal is written to the frame memory 13, the video signal in the frame memory 13 is read by raster address of the frame control circuit 15 and is converted to a raster signal. The video signal, which is converted to the raster signal, is converted to a composite video signal in the encoder 21 and is then converted to an analog video signal in a D/A converter 22. This analog video signal is then inputted to a monitor TV 23 to be displayed.

Second, the case of recording a motion video signal will be described. The input light from the lens 1 is converted to a digital signal by way of the process as described above in the case of the still video. This digital signal is converted to the video signal in the digital signal processing circuit 6. The address switching circuit 18 switches to the line memory control side, and then the video signal is written to the line memory 14 by the control of the line memory control circuit 16 and is converted to a n×n block signal. The video signal, which is converted to the block signal, is stored in the buffer 19, and is then compressed in the compression circuit 7. Finally, the video data is recorded in the memory card 11 by the record/reproduce circuit 20.

In the case of reproduction, the compressed data is reproduced in the record/reproduce circuit 20 and is then converted inversely to the block video signal in the compression circuit 7. This block video data is stored in block buffer 19 and is then written to the line memory 14 by the control of the line memory control circuit 15. The video signal in the line memory 14 is read by raster address of the line control circuit 16 and is converted to a raster signal. The video signal, which is converted to the raster signal, is converted to an analog composite video signal in a D/A converter 22. This analog composite analog video signal is then inputted to the monitor TV 23 to be displayed.

Figures 3A, 3B, 3C, 3D, 3E:
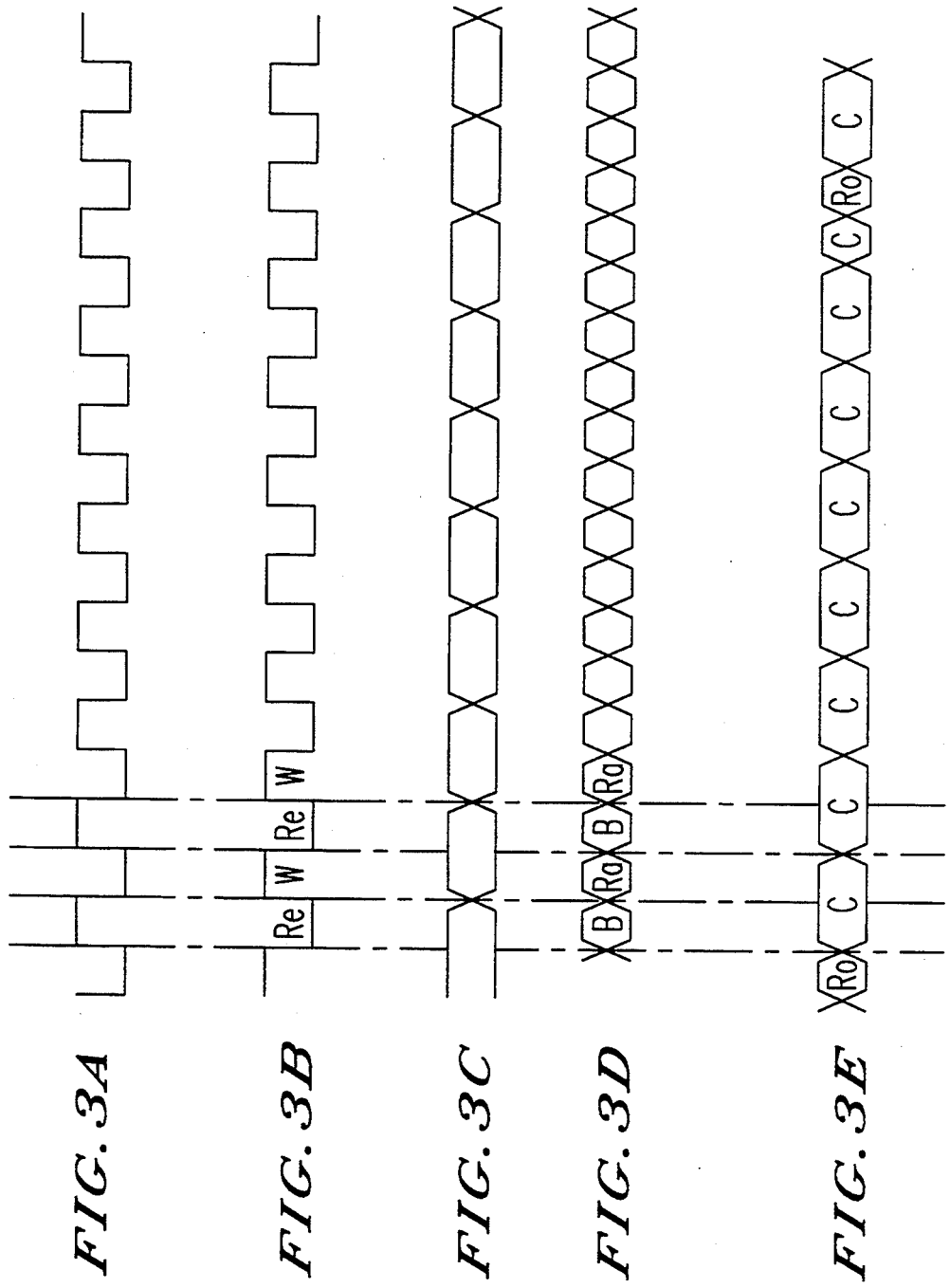
FIGS. 3(a)–3(e) are a timing chart of the structure in FIG. 2.

FIG. 3 is a timing chart of the operation of the above described first embodiment. FIG. 3(a) shows the operation of a CCD clock, FIG. 3(b) shows the operation of read/write from/to the memory 5 in FIG. 1, FIG. 3(c) shows the address of the block unit in FIG. 1, FIG. 3(d) shows the data of the data bus, and FIG. 3(e) shows the address of the high speed mode.

As shown in FIG. 3, read/write (Re/W) from/to the line memory 14 is executed in accordance with the operation of CCD clock ((a) in FIG. 3). At that time, the block signal B is read from the address of the block unit in memory 14 and the raster signal is written to it ((c) in FIG. 3). That is, there is a block signal and a raster signal alternately in the data bus. This invention uses the high speed mode to the memory. At that time, the row address Ro and the column address C which is n (for example 8) of the horizontal number of the block are set at the raster signal of CCD signal Ra is converted to the block signal B. In the case of reproduction, the block signal can be converted to the raster signal.

When the line memory 14 is 8 lines and two 4 Mbit DRAMs (512(column)×1024(row)×8(bit)) are used for the frame memory of the luminance signal and the color difference signals, a portion thereof of 768(column)×8(row)×8(bit)×2 (about 100 Kbit) can be used for the line memory.

FIG. 4 is a block diagram of a second embodiment of the present invention. In the second embodiment of FIG. 4, an adder/subtracter 24 outputs the difference data between the video data in the frame memory 13 and the video signal from the data bus, or the addition signal of the difference signal and the video signal in the frame memory. A switch 25 is for controlling ON-OFF of the adder/subtracter 24 and the frame memory 13.

In the compression of the motion video, there is not only space correlation but also time correlation in order to make a higher compression ratio of the video signal. However, the previous one frame video data must be prepared in order to execute the time correlation. Therefore, in the second embodiment, the frame memory 13, which is used in the case of still video, is used for preparing the previous one frame video signal.

In FIG. 4, the output video signal of the digital signal processing circuit is switched from the line memory side to the frame memory side and a frame of the video data is stored in the frame memory 13. At this time, the frame memory 13 is used in a read-modify-write mode by the frame memory control circuit 15 and a frame of video signal is used as the one frame delay signal. The difference between the one frame signal and the next frame is executed in the adder/subtracter 24. This difference signal of raster signal is written to the line memory 14 by the line memory control circuit 16 and is then converted to the block signal. This block signal is compressed in the compression circuit 7 of the ADCT converter and is recorded in the memory card 11.

In the case of reproduction, the compressed difference signal is reproduced in a record/reproduce circuit 20 and is then converted inversely to the block signal data in the compression circuit 7. This block video difference signal is stored in a block buffer 19 and is then written to the line memory 14 on the control of the line memory control circuit 15.

The video difference data in the line memory 14 is read by raster address of the line control circuit 16 and is converted to the raster signal. The raster is added to the video signal which is read from the frame memory 13 in the adder/subtracter 24. The added video signal is then finally inputted to the monitor TV 23. Then the added video signal is written to the frame memory 13 and is added to the difference signal of the next frame. The process is then repeated.

FIG. 5 is a timing of the operation of the second embodiment. In FIG. 5, FIG. 5(a) shows the clock of CCD, FIG. 5(b) shows the data of data bus, FIG. 5(c) shows the signal read from the frame memory 13, FIG. 5(d) shows the timing of reading from the frame memory 13, FIG. 5(e) shows the signal read from the line memory 14, FIG. 5(f) shows the timing of reading from the line memory 14, FIG. 5(g) shows the signal written to the frame memory 13, FIG. 5(h) shows the timing of writing the signal to the frame memory 13, FIG. 5(i) shows the signal written to the line memory 14, and FIG. 5(j) shows the timing of writing the signal to the line memory 14.

As shown in FIG. 5, after the signal is read from the frame memory 13, the signal is read from the line memory 14. The new signal is written to the address in the frame memory 13 in which the previous data is read and the new signal is also written to the line memory 14. That is, there is the signal which is read from the frame memory 13 and the line memory 14 and the signal which is written to the frame memory 13 and the line memory 14 alternately.

Next, the technical advantages of the present invention will be described.

In the first and the second embodiments of the present invention, as the video signal of both the still video and the motion video is converted to the block signal and is then compressed in the same compression circuit, picking up an image in the case of both the still video and the motion video can be achieved and an even greater amount of the data is recorded in the recording media.

Moreover, in the case of the still video, the signal from the CCD 2 is stored in the frame memory 13 and the signal is read from the frame memory 13. Then the signal is converted to the video signal in the digital signal processing circuit 6. Therefore, the slower speed processing can be compared to the case of the motion video when the continuous image is taken. As a result, the process of a lower frequency clock in the digital signal processing can be used and a lower consumption can be achieved. Furthermore, when the CCD 2 is of a pixel mixing type, the data is read from the CCD 2 without mixing pixels and is written to the frame memory in the case of the still video. As a result, the resolution picture of the still video can be higher than that of the motion video.

Moreover, though the frame memory and the line memory can be installed respectively, a portion of the frame memory 13 can be used for the line memory 14 as described in the first embodiment; as a result, a smaller size circuit can be achieved.

In the second embodiment, the frame memory 13 for the still video is used for one frame delay in order to execute a difference between frames of the motion video. Therefore, a higher compression ratio of the motion video can be achieved. As a result, a greater amount of information can be stored in the recording media.

In the second embodiment, the difference signal is between the one previous frame signal in the frame memory and the signal on the data bus. Then this process is executed continuously. On the other hand, the difference signal can be between the first frame signal in the frame memory and the signal on the data bus. At this time, the difference signal between the first frame signal and the signal on the data bus is larger in proportion to the signal on the data bus is a later frame. Therefore the switch 25 is open once per several frames and a frame of the video signal is rewritten. After that, the difference only between the rewritten frame signal in the frame memory and the signal on the data bus is recorded in the memory card 11.

In describing preferred embodiments of the present invention illustrated in the drawings, specified terminology is employed for the sake of clarity. However, the present invention is not intended to be limited to the specific terminology so selected, and it is to be understood that each specific element includes all technical equivalents which operate in a similar purpose.

Obviously, numerous additional modifications and variations of the above-described embodiments of the present invention are possible, as appreciated by those skilled in the art, in light of the above teachings. It is therefore to be understood that within the scope of the appended claims and their equivalents, the present invention may be practiced otherwise than as specifically described herein.

What is claimed as new and desired to be secured by Letters Patent of the United State is:

1. A digital electronic camera apparatus which records a still video and a motion video, comprising:

image pickup means for picking up an image optically and converting the picked up optical image to a first analog signal;

analog/digital converting means for converting the first analog signal to an output digital signal;

digital processing means for converting the output digital signal to a luminance signal and color difference signals;

first memory means for storing a frame of the luminance signal and the color difference signals from the digital processing means, or a frame of the digital signal output from the analog/digital converting means;

second memory means for storing n, where n is an integer, lines of the luminance signal and the color difference signals;

third memory means for storing a block n×n signal from the luminance signal and the color difference signals which are stored in the second memory means, or which are output from the digital processing means;

compressing means for compressing the block n×n signal from the third memory means to generate a compressed signal; and recording means for recording the compressed signal from the compressing means in a recording media to generate a recorded signal.

2. The digital electronic camera apparatus of claim 1, further comprising:

reproducing means for reproducing the recorded signal from the recording media;

converting means for converting the reproduced recorded signal as inversely processed in the compressing means, the third memory means and the second memory means respectively, to generate a digital composite video signal;

digital/analog converting means for converting the digital composite video signal from the converting means to a second analog signal; and outputting means for outputting the second analog signal to an image reproducing means.

3. The digital electronic camera apparatus of claim 1, wherein a part of the first memory means is used for the second memory means.

4. The digital electronic camera apparatus of claim 1, wherein:
the first memory means stores a frame of the luminance signal and the color difference signals from the digital processing means in a case of recording the motion video and the first memory means stores a frame of the digital signal which is outputted from the analog/digital converting means in a case of recording the still video;
the second memory means stores the n lines of the luminance signal and the color difference signals in the case of recording the motion video; and
the third memory means stores the block n×n signal from the luminance signal and the color difference signals which are in the second memory means in the case of recording the motion video and which are output from the digital processing means in the case of recording the still video.

5. The digital electronic camera apparatus of claim 1, further comprising means for executing a difference signal between two consecutive frames stored in the first memory means in the case of recording the motion video, and wherein the difference signal is compressed and recorded in the recording media.

6. The digital electronic camera apparatus of claim 1, wherein a clock signal in the digital processing means in the case of recording the still video is slower than that in the case of recording the motion video.

7. The digital electronic camera apparatus of claim 1, wherein the image pickup means is a pixel mixing type and pixel mixing is not executed in the case of recording the still video.

8. The digital electronic camera apparatus of claim 1, wherein n=8.

9. A digital electronic camera apparatus which records a still video and a motion video, comprising:
image pickup device for picking up an image optically and converting the picked up optical image to a first analog signal;
an analog/digital converter for converting the first analog signal to an output digital signal;
a digital processor for converting the output digital signal to a luminance signal and color difference signals;
a frame memory for storing a frame of the luminance signal and the color difference signals from the digital processor, or a frame of the digital signal output from the analog/digital converter;
a line memory for storing n, where n is an integer, lines of the luminance signal and the color difference signals;
a buffer memory for storing a block n×n signal from the luminance signal and the color difference signals which are in the line memory, or which are output from the digital processor;
a compressor for compressing the block n×n signal from the buffer memory to generate a compressed signal; and
a recorder for recording the compressed signal from the compressor in a recording media to generate a recorded signal.

10. The digital electronic camera apparatus of claim 9, further comprising:
a reproducer for reproducing the recorded signal recorded in the recording media;
a converter for converting the reproduced recorded signal as inversely converted in the compressor, the buffer memory and the line memory respectively, to generate a composite digital video signal;
a digital/analog converter for converting the digital composite video signal from the converter to a second analog signal; and
an outputting device for outputting the second analog signal to an image reproducing device.

11. A digital electronic camera apparatus which records a still video and a motion video, comprising:
an image pickup device for picking up an image optically and converting the picked up optical image to a first analog signal;
an analog/digital converter for converting the first analog signal to an output digital signal;
a digital processor for converting the output digital signal to a luminance signal and at least one color difference signal;
a first memory for storing a frame of the luminance signal and the at least one color difference signal from the digital processor, or a frame of the digital signal output from the analog/digital converter;
a second memory for storing n, where n is an integer, lines of the luminance signal and the at least one color difference signal;
a third memory for storing the luminance signal and the at least one color difference signal which are stored in the second memory, or which are output from the digital processor;
a compressor for compressing the stored luminance and at least one color difference signals from the third memory to generate a compressed signal; and
a recorder for recording the compressed signal from the compressor in a recording media to generate a recorded signal.

12. The digital electronic camera apparatus of claim 11, further comprising:
a reproducer for reproducing the recorded signal recorded in the recording media;
a converter for converting the reproduced recorded signal as inversely converted in the compressor, the third memory and the second memory respectively, to generate a digital composite video signal;
a digital/analog converter for converting the digital composite video signal from the converter to a second analog signal; and
an outputting device for outputting the second analog signal to an image reproducing device.

13. The digital electronic camera apparatus of claim 11, wherein:
the first memory stores a frame of the luminance signal and the at least one color difference signal from the digital processor in the case of recording the motion video and a frame of the digital signal output from the analog/digital converter in the case of recording the still video;
the second memory stores the n lines of the luminance signal and the at least one color difference signal in the case of recording the motion video; and
the third memory stores the luminance signal and the at least one color difference signal which are in the second memory in the case of recording the motion video and which are output from the digital processor in the case of recording the still video.

* * * * *